United States Defensive Publication [19] (H) [11] T958,010

Eichenbaum et al. [43] May 3, 1977

[54] PROTECTION OF OPTICAL FIBERS FROM STATIC FATIGUE

[75] Inventors: Bernard Raymond Eichenbaum, Lilburn; Raffaele Antonio Sabia, Atlanta; Basant Kumar Tariyal, Stone Mountain, all of Ga.

[73] Assignee: Bell Telephone Laboratories, Incorporated, Murray Hill, N.J.

[21] Appl. No.: 690,091

[22] Filed: May 26, 1976

[51] Int. Cl.[2] ..... G02B 5/16

[52] U.S. Cl. ..... 350/96 WG

[57] ABSTRACT

Communications grade glass optical fibers are protected from static fatigue failure by an initial coating that reacts with surface silanol groups, thereby to occupy or tie up water vapor reaction sites. The OH surface radicals may be bonded to by condensation reactions including: esterification, carboxylation, etherification, chlorination and ammination. For speed and simplicity of reaction, silanation with silanes is attractive as, for example, hexamethyldisilizane (HMDS). The reaction is sufficiently fast to use in a continuous fiber drawing and in-line coating process. The barrier coating may be selected to bond relatively strongly to an outer abrasion protection polymeric coating. Bonding is also enhanced by creating an initial minimum, evenly distributed concentration, of surface silanol groups, for example, about 5 groups/100 Angstrom units in any direction. The reaction molecule is also large enough to act as a water vapor barrier. Application of HMDS advantageously is by a fiber-contacting wick of urethane foam applied directly after fiber drawing, and followed by heating and application of the abrasion resistant polymer. The latter is ethylene vinyl acetate or other polymer that does not cause microbending losses in the fiber.

4 Claims, No Sheets Drawing,

10 Pages Specification

The file of this unexamined application may be inspected and copies thereof may be purchased (849 O.G. 1221, Apr. 9, 1968).